United States Patent Office 3,369,869
Patented Feb. 20, 1968

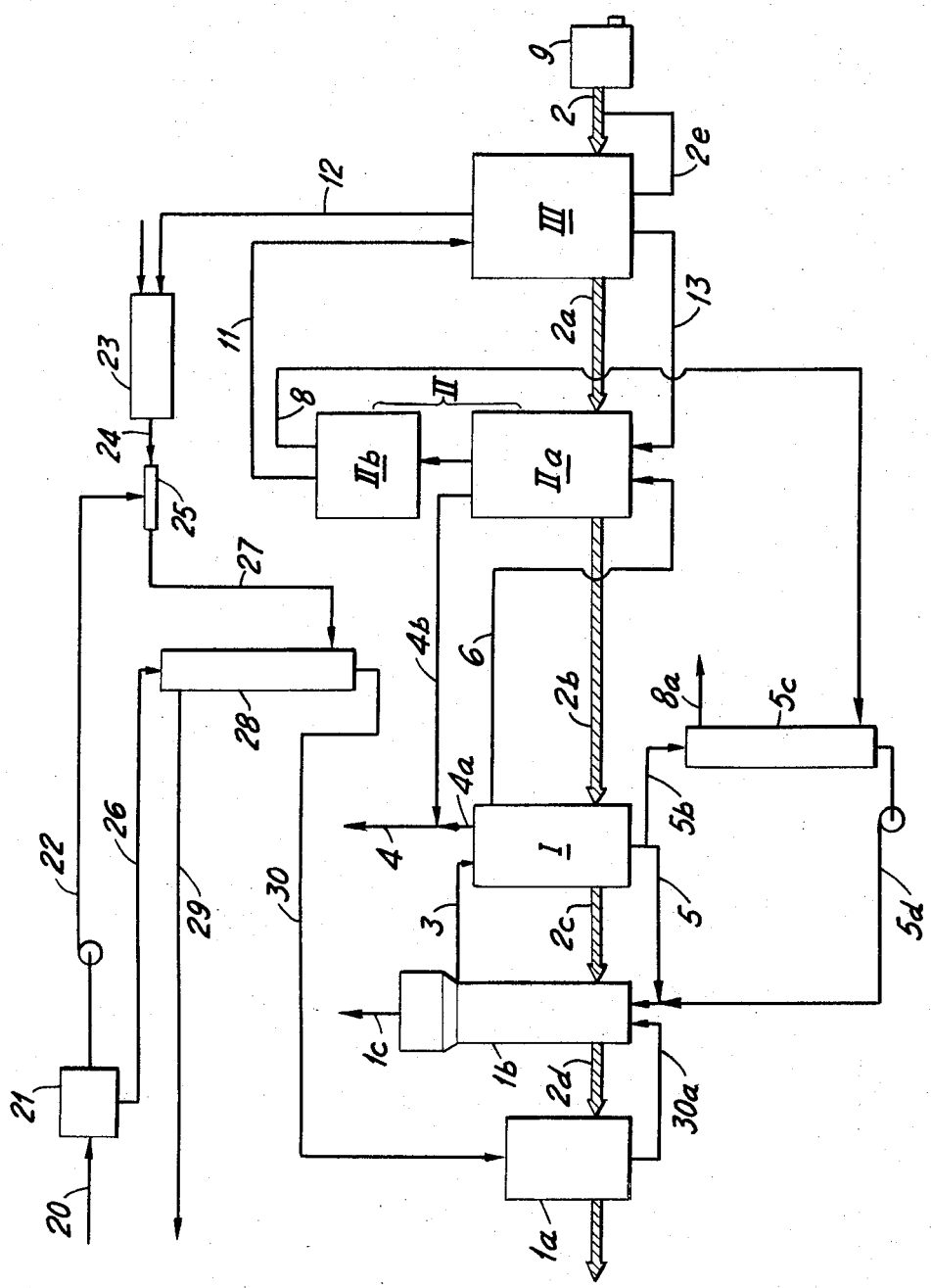

3,369,869
PROCESS FOR RECOVERING AMMONIA FROM AMMONIA-CONTAINING GAS BY MEANS OF SULFURIC ACID
Wilhelm Deiters, Chur, Grisons, Switzerland, assignor to Inventa AG fuer Forschung und Patentverwertung, Zurich, Switzerland
Filed Feb. 26, 1965, Ser. No. 435,498
Claims priority, application Switzerland, Feb. 27, 1964, 2,426/64
29 Claims. (Cl. 23—193)

ABSTRACT OF THE DISCLOSURE

A continuous process for recovering ammonia from hot and moist ammonia-containing gas such as coke oven gas. The gas is first cooled to condense a portion of the ammonia in the form of ammonia liquor. The gas is then mixed with sulfuric acid and the acid mixture thus obtained is neutralized with the ammonia liquor obtained by the cooling of the original gas. In this manner, an aqueous ammonia sulfate liquor is obtained which is introduced into a cyclically flowing hot melt of ammonium bisulfate. The ammonium sulfate is thus dehydrated and decomposed to form ammonium bisulfate and a first portion of gaseous ammonia. The ammonium bisulfate is then introduced into a cyclically flowing hot melt of a mixture of alkali metal sulfate and metal sulfate, to liberate a second portion of ammonia. Alkali metal bisulfate and pyrosulfate are formed in this step. The preferred metal sulfates are the sulfates of cobalt, iron, nickel, vanadium, titanium, aluminum and magnesium. The alkali metal bisulfate and pyrosulfate are then decomposed in the presence of the mixture of alkali metal sulfate and metal sulfate to form sulfuric acid. The sulfuric acid is conveyed back for mixing with a fresh amount of the gas after its cooling, while the mixture of alkali metal sulfate and metal sulfate is recycled for contact with further amounts of ammonium bisulfate.

This invention generally relates to ammonia and is particularly directed to a continuous process for recovering ammonia from an ammonia-containing gas, wherein the scrubbing of the gas is effected with sulfuric acid which has been recovered by thermal decomposition of ammonium sulfate which is obtained in the process.

While the invention is applicable to the recovery of ammonia from any suitable ammonia-containing gas, the invention will be described with particular reference to coke oven gas.

It is known in the art to wash out ammonia from coke oven gas by means of sulfuric acid in which event crystalline ammonium sulfate may be recovered as final reaction product. The high cost of sulfuric acid and the difficulties in marketing ammonium sulfate make, however, such prior art processes wherein the final product is ammonium, highly uneconomical. In the recovery of ammonia from coke oven gas by means of sulfuric acid, an optimum procedure would, of course, be a process wherein the initially formed ammonium sulfate is again decomposed into sulfuric acid and ammonia and the sulfuric acid is recycled to the process for reaction with further amounts of ammonia in coke oven gas while the ammonia by liquifaction is converted into a marketable product.

Accordingly, it is a primary object of this invention to provide a process for recovering ammonia from an ammonia-containing gas such as coke oven gas by means of sulfuric acid, wherein the ammonium sulfate initially formed in the process is decomposed into ammonia and sulfuric acid which latter product is recycled into the process.

In order to attain the above mentioned object, a technically feasible and economical procedure is required according to which ammonium sulfate can successfully and economically be decomposed into ammonia and sulfuric acid.

It has previously been suggested to limit the splitting off of ammonia from ammonium sulfate to an intermediate stage, that is, to such an extent that ammonium bisulfate is formed. The ammonium bisulfate, which is a weak acid, may then in the form of an aqueous solution be directly used for scrubbing the coke oven gas. However, scrubbing with sulfuric acid, as compared to scrubbing with the acid sulfate, has certain advantages. Thus, if the scrubbing is effected with sulfuric acid proper, the reaction with the ammonia is more complete because the strong hydrogen ion of the sulfuric acid is capable of picking up the last traces of ammonia in the gas in a more efficient manner than the weak hydrogen ion of the bisulfate. This is particularly true if the scrubbing is effected in countercurrent. Further, considering the desirability for a continuous process, the known procedures for recovering the ammonia have the serious drawback that the ammonium sulfate, which separates in crystalline form, has to be centrifuged, filtered, dried and introduced into the decomposition stage in solid form.

Similar drawbacks and obstacles preventing continuous operation, are inherent in other prior art processes wherein the ammonium sulfate is completely split by means of metal oxides, such as iron oxide, zinc oxide and the like. In these latter prior art processes, metal sulfates are initially formed which, under liberation of ammonia, are subsequently thermically decomposed into sulfur oxides and metal oxide. The difficulty to perform such processes continuously is primarily predicated on the fact that the solid oxides or sulfates either have to be transported or the temperatures of the individual reactors have, for brief periods, to be subjected to strong fluctuations.

In more recent times, the known reaction between ammonium bisulfate and alkali sulfate has been suggested for carrying out complete ammonium sulfate splitting. This reaction proceeds according to the formula

$$NH_4HSO_4 + M_2SO_4 \rightarrow 2MHSO_4 + NH_3$$

wherein M stands for potassium or sodium. The acid alkali metal sulfate which is formed in this manner liberates water and sulfur oxide via the pyrosulfate. The alkali metal sulfate which is reformed in the process is then recycled into the process in solid form. Also, this known procedure could not be carried out in a fully automatic and continuous manner in the processing of coke oven gas because means had to be provided for transporting the solid material.

Accordingly, it is a further object of this invention to overcome the disadvantages of the prior art processes and to provide a process of the kind referred to which may be carried out in a fully automatic and continuous manner.

Briefly, and in accordance with the invention, the decomposition of the ammonium sulfate into ammonia and sulfuric acid, in combination with the sulfuric acid scrubbing of coke oven gas which results in the initial formation of the ammonium sulfate, is carried out in a fully continuous manner by performing the entire decomposition process, including the recycling of the alkali sulfate, in the flowing medium of solvent salt melts.

The gas to be purified, after separation of condensable ammonia liquor, is mixed with sulfuric acid which has been recovered from and recycled to the process, whereafter the acid mixture is neutralized with the previously separated condensed ammonia liquor. The ammonium sulfate thus obtained is in the form of an aqueous solution and, if desired, after concentration, subjected to a treatment in solvent melts containing one or several of ammonium sulfates, alkali metal sulfates, alkali pyrosulfates or other metal sulfates or mixtures of such salts. This treatment is effected at elevated temperatures for the purpose of deyhdrating and decomposing the ammonium sulfate. These salt melts are conducted in the form of one or several circuits or circulating systems and enable the continuous performance of the process. In order to obtain a sharp separation between the liberated ammonia and the sulfuric acid to be recycled, an alkali metal sulfate should be present which, after having taken part in the reaction, is continuously recycled into a preceding stage of the process which corresponds to a splitting degree of about 50% of the ammonia which is present in the ammonium sulfate initially employed.

More specifically, the inventive procedure thus resides in a continuous process of recovering ammonia from a hot and moist ammonia-containing gas, such as coke oven gas, which comprises the combination of the following steps:

(a) The gas is first cooled, whereby a portion of the ammonia in the gas condenses in the form of ammonia liquor;

(b) the gas is then mixed with sulfuric acid;

(c) the acid mixture thus obtained is neutralized with the ammonia liquor of (a) whereby an aqueous ammonium sulfate liquor is obtained;

(d) the ammonium sulfate liquor is then introduced into a cyclically flowing hot melt of ammonium bisulfate, whereby the ammonium sulfate is first dehydrated and then decomposed into ammonium bisulfate and a first portion of ammonia is liberated; before introducing the ammonium sulfate liquor into the melt, it may be concentrated to remove water;

(e) the ammonium bisulfate thus formed is then introduced into a cyclically flowing hot melt of a mixture of alkali metal sulfate and metal sulfate, whereby a second portion of ammonia is liberated and alkali metal bisulfate and pyrosulfate are formed;

(f) the first and second portions of ammonia are recovered;

(g) the alkali metal bisulfate and the pyrosulfate are decomposed in the presence of the mixture of alkali metal sulfate and metal sulfate referred to, to form sulfuric acid;

(h) the sulfuric acid is then conveyed to step (b) above for mixing with further amounts of the ammonia-containing gas and (i) the mixture of alkali metal sulfate and metal sulfate of step (g) is recycled to step (e) for contact with further amounts of ammonium bisulfate.

The ammonium bisulfate melt of step (d) could, under certain circumstances, be partially or totally replaced by alkali metal bisulfate.

The single figure of the drawings diagrammatically illustrates an embodiment of a plant for carrying out the inventive process.

Uninterrupted flow of the reacting mixture is achieved in that irreversible solidification of the mixture is avoided by a suitable choice of the compositon of the mixture. From a practical point of view, it has proved to be expedient to render the continuity of the progress of the entire process possible by coupling a plurality of circuits with one another. The process can thus be divided into, for example, two cycles. Accordingly, the ammonium sulfate liquor to be regenerated is introduced—if required after preceding concentration in a concentrator $1a$—into a self-contained molten ammonium bisulfate circuit. In the first stage embodied by the evaporator $1b$ of this circuit the residual water of the liquor is evaporated at about 200–230° C. The ammonium sulfate remaining in solution is split in the second state (I) to bisulfate. This is accomplished by raising the temperature to about 300–320° C. In this manner an almost pure bisulfate melt can flow back to the first stage by way of 5. The process is in no way impaired even if the conversion rate is less than 100%. Dry ammonia is recovered 4 as cleavage or decomposition product. If, due to irregularities in the temperature control, small portions of the ammonia should pass into the vapor in the evaporation stage $1b$, recovery thereof is possible by fixing or absorption on ion exchangers and subsequent separation or dissolution with sulfuric acid.

An amount of ammonium bisulfate which corresponds to the ammonium sulfate originally introduced is transferred from the first circuit to a second circuit. This ammonium bisulfate passes for this purpose through conduit 6 into the decomposition reactor II$a$, in which mixing is carried out with recycled melt 13 (referred to below) which latter consists essentially of the sulfates of sodium, potassium and cobalt. The composition of this mixture is chosen so that the mixture can be easily conveyed at the required reaction temperatures. The cobalt sulfate, which should be present in a concentration of about 39 to 50%, calculated on the total sulfate amount of the mixture, acts not only as a fluxing agent, but also as a catalyst and can be partially or entirely replaced in this function by the sulfates of other metals, such as, for example, iron, nickel, vanadium, titanium, aluminum, magnesium or the like. Good results are obtained if about 2 percent by weight of the cobalt sulfate is replaced by one of the other metal sulfates. Any proportion of potassium sulfate or sodium sulfate may be employed as the alkali constituent, but it should at least correspond to the stoichiometric amount of the ammonium sulfate to be reacted.

The heat requirement necessary in the reactor II$a$ (temperature below 500° C.) can be covered by extraneous heating if the thermal capacity of the returned salt melt is not sufficient. If, however, the heat content of the potassium sulfate melt is so large that, on immediate addition of the total amount too high an initial temperature would result in stage II of the process, it is advisable to produce, by metered addition of the hot alkali sulfate melt to the cooler ammonium bisulfate, a steady and gradual rise in the temperature during the course of this reaction. The gradual temperature increase facilitates, on the one hand, the complete splitting off of ammonia, but, on the other hand, prevents the commencement of the splitting off of acid.

As is known, the splitting off of ammonia in the course of the reaction of ammonium bisulfates with alkali sulfate is promoted by vacuum conditions or by the presence of a flowing gas or vapor. In some instances, it is beneficial to superheat this auxiliary gas before introduction into the system. As protective removal of the residual ammonia is of particular importance in view of the closely adjacent temperature limit at which acid is split off, the use of the described measures is recommended in dependence on the operating conditions. For example, a mixture of inert gas and steam can be passed through the reactor assembly II by following up the atmospheric stage II$a$ with an additional after-reaction in reactor II$b$ under low vacuum.

After separation of the cleavage products, the auxiliary gases or vapors which have been used to assist the reaction, can be returned to the reactor, with the smallest possible loss of heat, in the form of a continuous circuit.

The salt melt, liberated from the ammonia, contains now the circulating sulfates and a mixture of alkali bisulfate and pyrosulfate. This melt is now fed by way of the conduit 11 to the acid decomposer III, in which the temperature is increased, either by indirect, for example radiant, heating or by means of directly introduced superheated combustion gas. This temperature is raised to such an extent until—under splitting off of sulfur trioxide and dioxide 12—the bisulfate and pyrosulfate are converted into alkali sulfate (about 500–800° C.). The remaining melt returns to IIa by way of the conduit 13 in the manner described.

The splitting off of the acid can be carried out in the most diverse manners. Depending upon the desired nature of the product obtained—sulfuric acid, SO₃ or oleum—the process may take place either in dry form or in the presence of a combustion gas. In the first case, the necessary heat is supplied indirectly, for example by means of electrically fed radiant bodies. According to the second possibility, the heat is directly transferred, for example by means of a burner provided within the reaction chamber. The reactor proper may comprise a divided or undivided chamber of a corrosion-resistant ceramic material. The chamber may accommodate different types of ceramic material and also bodies exerting catalytic action, such as, for example, quartz, kieselguhr active carbon, finely divided noble metals, metallic oxides or the like. It is advantageous if the salt melt is subjected to the heat action in a thinly flowing layer or in finely divided form.

The difficulties in accomplishing splitting increase with the degree of decomposition. For this reason, it is advantageous to cause the continuous flow of the melt to pass through zones of increasing temperatures, so that the first portions of acid in each batch are obtained at a lower temperature and the last portions at the highest temperature. Since the nature and composition of the acid gas depend on the temperature of nascence, it is advisable to collect the gases obtained in the different temperature zones in fractioned form, in order to be able to work them up appropriately. Should solid alkali sulfate be deposited in any part of the reactor in the course of the process, it can easily be dissolved with the aid of one of the melts and in this way returned to the circuit.

This part of the process may, for example, be carried out in a Cowper like unit which consists, for example, of three alternately operated reactors which are equipped with heat and corrosion resistant material. The following phenomena then take place at the same time:

In the highly heated Cowper stove or furnace I, downward trickling bisulfate-pyrosulfate melt is decomposed under consumption of heat to yield sulfur oxides and solid alkali sulfate at about 800–500° C., which latter is deposited. In Cowper II, this alkali sulfate is dissolved at about 450–390° C. by fresh ammonium bisulfate melt under the formation of ammonia and alkali bisulfate or pyrosulfate. Cowper III is again brought to the high splitting temperature of about 850° C. by direct combustion of fuel gas. During this cycle, the ammonium bisulfate accordingly flows through Cowper II and reaches Cowper I in the form of alkali bisulfate-pyrosulfate where it is deposited as alkali sulfate. In the meantime, fuel gas burns in Cowper III. Subsequently, the change from III to I, I to II and II to III takes place.

Certain quantities of salt are entrained as vapor or sublimate by the gases produced in the splitting process. They can be purified by scrubbing them with one of the circulating melts. Under certain conditions, however, it is also possible to produce in the vertically ascending gas flow a reflux of condensed salt melt which likewise exerts a purifying scrubbing action. According to another possibility, purification of the acid gases is accomplished by first binding the salts by scrubbing with concentrated sulfuric acid or oleum whereafter the salts are separated subsequently in known manner.

The proportion of sulfur dioxide contained in the acid splitting gas is best after-oxidized in known manner by contact with a catalyst, for example vanadium pentoxide. This is best accomplished after absorption of the sulfur trioxide in sulfuric acid. The ratio of dioxide to trioxide can already be controlled within certain limits during their formation, by maintaining a suitable reducing or oxidizing atmosphere.

In operating in a moist atmosphere, the sulfuric acid produced can be separated in liquid form. However, the uncooled acid vapor mixture may also be employed directly. To this end, the vapor mixture is mixed with the coke oven gas to be purified by means of a mixing device, for example an orificer 25, after the coke oven gas has previously been freed from the main quantity of ammonia water or liquor by condensation. After a dwell time sufficient for the quantitative reaction of the residual ammonia with the excess acid vapors, complete neutralisation of the gas mixture is effected in the wash tower 28 with the ammoniacal condensate, i.e. the ammonia liquor, which is supplied from the condenser 21 by way of the conduit 26. While the purified gas leaves the plant through the conduit 29, the ammonium sulfate liquor thus formed flows from wash tower 28 through conduit 30 to the evaporator 1a, from which the concentrated liquor passes into the first circuit of the decomposition plant in the above-described manner by way of the conduit 30a.

In order to recover a dry gas for liquefaction, part of the ammonia from the second decomposition stage (for example, represented by the conduit 8) must be freed from the water which partly originates from the decomposition of the sodium bisulfate and which partly has been added to promote the splitting off of ammonia. To this end, the moist gas is treated with a partial stream of the ammonium bisulfate flowing off from the reactor I 5b, the ammonia thus being absorbed while the water flows through together with the inert gas 8a. For example, the ammonia gas may be scrubbed in counter-current with ammonia bisulfate in a scrubbing tower 5c at temperatures between 150–200° C., in which event the bulk of the ammonia is bound. The major amount of the water steam passes through together with the remaining gases 8a and, after suitable heating, can again be injected into the reactor II as auxiliary gas. In this way, residual amounts of ammonia, which have not been absorbed in the scrubbing tower 5c can be recovered. The charged or enriched branch stream of the ammonium bisulfate flows back into the first circuit by way of 5d, so that this after-dried ammonia is now additionally obtained through conduit 4. The total amount of ammonia gas recovered can be liquefied and sold.

The energy for the entire process can essentially be produced in an oil or gas burner unit, indicated diagrammatically by the combustion chamber 9, the hot flue gases of which flow through the reactors and evaporators in counter-current to the direction in which the process takes place (see hatched line 2–2d), and in so doing the flue gases are utilized in the most economical manner. If required, peak temperatures can be produced by means of radiant electric heaters, for example in the reactor III. Moreover, the latter can additionally be heated by a separate burner of by a part flue of the hot flue gases.

The decomposition temperature can be favorably influenced, both in the acid and in the ammoniacal stages, by the presence of catalysts. Such catalysts may, on the one hand, advantageously comprise the sulfates and oxides of various metals, for example those of iron, cobalt, nickel, molybdenum, tungsten, vanadium, tantalum, titanium, aluminum, magnesium, while, on the other hand, a number of surface-active substances, such as kieselguhr, quartz, active carbon, finely divided noble metals and the like are suitable.

The simultaneous use of vacuum or carrier gases is advantageous in all instances.

In view of the extremely corrosive properties of the salt melts employed, it is advisable to dispense with conventional pumps as conveying means as far as possible and instead to replace them by gas or steam-jet elevators or lifts, which have proved to be particularly suitable in the form of the so-called air-lift or "mammoth" pump.

The invention will now be described by a specific example with reference to the single figure, it being understood that this example is given by way of illustration and not by way of limitation and that many changes may be effected in the process conditions without affecting the scope and spirit of this invention as recited in the appended claims.

*Example*

12,125 Nm.³ of a coke oven gas containing about 10 g. of ammonia/Nm.³ are prepurified in a conventional manner 20 and freed from a part of their ammonia by coling-condensation 21. An aqueous condensate 26 (ammonia liquor) containing about 73 kg. of ammonia is thus obtained. The gas treated in this manner, with a residual content of about 4 g. of ammonia Nm.³, is conveyed through conduit 22 to an orificer or intensive mixer 25, where it is mixed with the hot sulfuric acid containing vapors 24 which were obtained by the splitting of ammonium sulfate. The sulfur dioxide constituent originally contained in the vapors had previously been converted into trioxide in known manner in a catalytic oxidation reactor 23 by catalytic oxidation.

After a dwell time which is sufficient completely to neutralize the ammonia in the gas, the acid gas mixture thus obtained is scrubbed in a tower 28 with the ammonia condensate 26. The circulation of liquid is maintained at such dimensions and proportions that the scrubbing is sufficiently intense entirely to remove the acid and alkali constituents from the gas. The residual content of ammonia in the purified gas 29 is about 2 g. per 100 Nm.³.

The wash liquid thus obtained contains 470 kg./h. of ammonium sulfate and is concentrated by evaporation 1a almost to its saturation point, i.e. to a concentration of about 45–48%. The concentrate is then introduced 30a through a nozzle into a circulating system of about 5,000 kg./h. of molten ammonium bisulfate, the temperature and thermal capacity of which are so high that the residual water evaporates completely. A temperature of about 200–230° C. is maintained in the evaporating vessel by supplying extraneous heat. The ammonium sulfate which dissolves in the bisulfate melt is conveyed 3 with the latter to the first decomposition reactor I, where a temperature of about 300–320° C. is reached by indirect heating, this temperature being sufficient for splitting off approximately the first half of the total ammonia content in the sulfate, to wit, about 54.9 kg./h. 4a. This quantity does not include the proportion of ammonia which is returned for drying purposes. After leaving this reactor, the ammonium bisulfate melt, with a slight residual content of ammonium sulfate, is conveyed back 5 to the evaporator 1b.

A mixture of 377 kg./h. of ammonium bisulfate and 35 kg./h. of unconverted ammonium sulfate is transferred from the self-contained bisulfate circuit 6 to the second circuit in a steady flow, for further splitting. In the first reactor IIa of this system, which is likewise self-contained, the ammonium bisulfate melt is brought together with a high-temperature return melt 13 from the last reactor III, which latter melt consists of a mixture of 830 kg. of potassium sulfate, 184 kg. of sodium sulfate and 342 kg. of cobalt sulfate. The ammonium bisulfate reacts with the potassium sulfate in a temperature range of about 390–420° C. to yield potassium bisulfate and ammonia. For the purpose of maintaining protective temperature conditions, this reaction, or at least the last stage thereof, can be carried out under vacuum in a second reaction vessel IIb. While 63.7 kg./h. of ammonia escape 4b and 8, the potassium sulfate is converted with increasing temperature to an increasing extent and under splitting off of water into potassium pyrosulfate.

A melt containing the sulfates of sodium and cobalt in addition to a mixture of potassium pyrosulfate and bisulfate (910 kg., calculated as pyrosulfate) flows from the vacuum vessel IIb by way of the conduit 11 into the last reactor III. To obtain the splitting of the acid, the temperature is increased further, the last portions of sulfur oxides being expelled above 700° C. is produced by direct combustion of fuel gas 2e, it being possible to preheat gas and air by means of waste heat. The gases of combustion are blown directly into the melt and passed over the flowing film. Their quantity is so proportioned that their water content assists in adjusting the concentration of sulfuric acid. The melt flowing off from this reactor 13 consists essentially of the sulfates of potassium, sodium and cobalt. It passes back directly into the second ammonia stage II. In this way, this circuit is also closed. The hot acid gases 12 are after-oxidized catalytically 23—partially in the case of fractional collection—by known methods and thereafter used directly for the coke oven gas purification.

While the ammonia of the first stage 4a is dry and can be liquefied direct, the ammonia recovered in the second stage, or at least a part thereof 8, still contains water and must be freeed therefrom. To this end, a part of the circulation of ammonium bisulfate 5b is conveyed through a scrubbing tower 5c in which the moist ammonia gas 8 flows to meet it. The combined ammonia is additionally recovered as dry product in the first decomposition stage I. Ammonia which is not absorbed and which escapes 8a at the top of the tower together with any inert gas or vapor which may be present, may be returned to the circuit.

While a specific embodiment of the invention has been shown and described in detail to illustrate the application of the inventive principles, it will be understood that the invention may be embodied otherwise without departing from such principles.

What is claimed is:

1. A continuous process of recovering ammonia from a hot and moist ammonia-containing gas, such as coke oven gas, which comprises:
   (a) cooling the gas, whereby a portion of the ammonia in the gas condenses in the form of ammonia liquor;
   (b) mixing the gas with sulfuric acid;
   (c) neutralizing the acid mixture thus obtained with the ammonia liquor of (a), whereby an aqueous ammonium sulfate liquor is obtained;
   (d) introducing the ammonium sulfate liquor into a cyclically flowing hot melt of ammonium bisulfate to dehydrate and to decompose the ammonium sulfate to ammonium bisulfate and a first portion of gaseous ammonia;
   (e) introducing the formed ammonium bisulafte into a cyclically flowing hot melt of a mixture of alkali metal sulfate and metal sulfate selected from the group consisting of the sulfates of cobalt, iron, nickel, vanadium, titanium, aluminum and magnesium, whereby a second portion of ammonia is liberated and alkali metal bisulfate and pyrosulfate are formed;
   (f) recovering said first and second portions of ammonia;
   (g) decomposing the alkali metal bisulfate and pyrosulfate in the presence of said mixture of alkali metal sulfate and metal sulfate to form sulfuric acid;
   (h) conveying the sulfuric acid to step (b) for mixing with said gas; and
   (i) recycling the mixture of alkali metal sulfate and metal sulfate of step (g) to step (e) for contact with further amounts of ammonium bisulfate.

2. A process as claimed in claim 1, wherein the aqueous ammonium sulfate liquor of (c) is concentrated before being introduced into step (d).

3. A process as claimed in claim 1, wherein the decomposition of the ammonium sulfate is effected at temperatures of between about 200–800° C.

4. A process as claimed in claim 1, wherein the sulfuric acid of (h) is conveyed to step (b) in admixture with combustion gases formed during the formation of the acid.

5. A process as claimed in claim 1, wherein the aqueous ammonium sulfate liquor of step (c) is concentrated to almost 50% concentration before being introduced into step (d).

6. A process as claimed in claim 5, wherein the hot melt of ammonium bisulfate of step (d) is first maintained at a temperature of between about 200–300° C., whereby the ammonium sulfate introduced into the melt dissolves in said ammonium bisulfate melt, whereafter the temperature of the melt is raised to about 300–320° C. to convert the ammonium sulfate to ammonium bisulfate and ammonia.

7. A process as claimed in claim 1, wherein the amount of ammonium bisulfate from step (d) continuously introduced into step (e) is substantially equal to the amount of ammonium bisulfate formed in step (d) by the decomposition of the ammonium sulfate continuously introduced from step (c).

8. A process as claimed in claim 1, wherein step (e) is carried out at a temperature of about between 390–420° C.

9. A process as claimed in claim 8, wherein step (e) is carried out in the presence of a member selected from the group consisting of potassium sulfate, sodium sulfate and mixtures thereof.

10. A process as claimed in claim 1, wherein step (g) is carried out at a temperature of about between 500–800° C., whereby alkali metal sulfate, sulfuric acid and sulfur oxides are formed.

11. A process as claimed in claim 1, wherein the temperature during step (g) is between 500–800° C., whereby distinct sulfuric acid fractions are formed which are separately withdrawn from the decomposition process.

12. A process as claimed in claim 1, wherein the melt of step (e) contains cobalt sulfate, whereby the melt obtained in step (g) comprises alkali metal sulfate and cobalt sulfate, said last mentioned melt being recycled to step (e) in liquid state.

13. A process as claimed in claim 1, wherein alkali metal sulfate and metal sulfate formed in step (g) are recycled to step (e) by means of bisulfate melt.

14. A process as claimed in claim 1, wherein the melts are thermically treated in the presence of nonreducing gases.

15. A process as claimed in claim 14, wherein said gases are preheated to the respective temperatures of the melts, said gases being recycled to preceding steps of the process upon separation of the respective decomposition products.

16. A process as claimed in claim 1, wherein salt vapors formed during the process are separated from the gaseous reaction products formed in steps (d)–(i) by washing with one of the melts.

17. A process as claimed in claim 1, wherein salt vapors formed ruring the process are separated from the gaseous reaction products formed in steps (d)–(i) by causing reflux conditions in the ascending gas flow.

18. A process as claimed in claim 1, wherein sulfur oxides are formed in step (g), said sulfur oxides being washed with a member selected from the group consisting of concentrated sulfuric acid and sulfuric acid containing sulfur trioxide to remove salt vapors therefrom.

19. A process as claimed in claim 1, wherein sulfur oxides are formed in step (g), the amount of said sulfur oxides being adjusted by maintaining a reducing or oxidizing atmosphere during the formation of the sulfuric acid.

20. A process as claimed in claim 1, wherein sulfur oxides are formed in step (g), said sulfur oxides being subsequently oxidized to sulfuric acid.

21. A process as claimed in claim 1, wherein the heat energy necessary for carrying out the process is supplied by hot flue gases which are directed in countercurrent to the flow direction of the reacting mixture.

22. A process as claimed in claim 21, wherein an additional heat source is provided for step (g) to reach peak temperatures during the formation of the sulfuric acid.

23. A process as claimed in claim 1, wherein ammonia obtained in the process contains water and accompanying gases, said water and gases being removed by contact with said ammonium bisulfate melt, said gases being recycled into the process for facilitating the flowing movement of freshly formed ammonia away from the system.

24. A process as claimed in claim 1, wherein ammonia contained in discharged condensate water is absorbed on ion exchangers, dissolved therefrom by sulfuric acid and then recycled into the process.

25. A process as claimed in claim 1, wherein the decomposition temperatures are reduced by catalysts selected from the group consisting of kieselguhr, quartz, active carbon, noble metals in finely divided form, and oxides and sulfates of iron, cobalt, nickel, molybdenum, tungsten, vanadium, tantalum, titanium, aluminum and magnesium.

26. A process as claimed in claim 1, wherein said step (g) is carried out in a Cowper unit comprising at least three Cowpers having a ceramic grid structure.

27. A process as claimed in claim 26, wherein the first Cowper is heated to about 850° C., whereafter melt from step (e) introduced thereinto is decomposed under heat consumption to form alkali metal sulfate and sulfuric acid, whereafter said formed alkali metal sulfate and melt from step (d) are fed to the second Cowper having a temperature of about between 450 and 390° C., whereby ammonia and alkalibisulfate are formed whereafter the product of the second Cowper is introduced into the third Cowper which is maintained at a temperature of about 850° C., whereby further amounts of alkali metal sulfate and sulfuric acid are formed.

28. A continuous process of recovering ammonia from a hot and moist ammonia-containing gas, such as coke oven gas, which comprises:
(a) cooling the gas, whereby a portion of the ammonia in the gas condenses in the form of ammonia liquor;
(b) mixing the gas with sulfuric acid;
(c) neutralizing the acid mixture thus obtained with the ammonia liquor of (a), whereby an aqueous ammonium sulfate liquor is obtained;
(d) introducing the ammonium sulfate liquor into a cyclically flowing hot melt of ammonium bisulfate to dehydrate and to decompose the ammonium sulfate to ammonium bisulfate and a first portion of gaseous ammonia;
(e) introducing the formed ammonium bisulfate into a cyclically flowing hot melt of a mixture of alkali metal sulfate and metal sulfate selected from the group consisting of the sulfates of cobalt, iron, nickel, vanadium, titanium, aluminum and magnesium, whereby a second portion of ammonia is liberated and alkali metal bisulfate and pyrosulfate are formed, at least the major amount of said metal sulfate being cobalt sulfate;
(f) recovering said first and second portions of ammonia;
(g) decomposing the alkali metal bisulfate and pyrosulfate in the presence of said mixture of alkali metal sulfate and metal sulfate to form sulfuric acid;
(h) conveying the sulfuric acid to step (b) for mixing with said gas; and
(l) recycling the mixture of alkali metal sulfate and metal sulfate of step (g) to step (e) for contact with further amounts of ammonium bisulfate.

29. A process as claimed in claim 28, wherein between about 39–50 percent by weight of cobalt sulfate, calculated on the total amount of the sulfate in the mixture, are present in the melt of step (e).

References Cited

UNITED STATES PATENTS

| | | | |
|---|---|---|---|
| 1,703,405 | 2/1929 | Osborne | 23—196 |
| 2,899,277 | 8/1959 | Holowaty | 23—119 |
| 2,927,001 | 3/1960 | McCullough | 23—119 |
| 3,086,846 | 4/1963 | Clark | 23—167 |

FOREIGN PATENTS 23,889   11/1908   Great Britain.

MILTON WEISSMAN, *Primary Examiner.*

OSCAR R. VERTIZ, *Examiner.*

H. S. MILLER, *Assistant Examiner.*